(12) United States Patent
Hamming

(10) Patent No.: US 7,134,624 B2
(45) Date of Patent: Nov. 14, 2006

(54) LOCKING DUAL HUB TAPE REEL FOR TAPE DRIVES

(75) Inventor: John A. Hamming, San Clemente, CA (US)

(73) Assignee: Certance, LLC, Costa Mesa, CA (US)

( * ) Notice: Subject to any disclaimer, the term of this patent is extended or adjusted under 35 U.S.C. 154(b) by 154 days.

(21) Appl. No.: 10/739,325

(22) Filed: Dec. 19, 2003

(65) Prior Publication Data

US 2004/0129817 A1     Jul. 8, 2004

Related U.S. Application Data

(60) Provisional application No. 60/435,674, filed on Dec. 19, 2002.

(51) Int. Cl.
*G11B 15/66* (2006.01)
(52) U.S. Cl. .................. 242/332.4; 242/332.7
(58) Field of Classification Search ............ 242/332.4, 242/332.7, 332.8, 532.1, 532.6, 582, 587.1, 242/587.2
See application file for complete search history.

(56) References Cited

U.S. PATENT DOCUMENTS

| 6,082,652 A | 7/2000 | Theobald |
| 6,227,475 B1 | 5/2001 | McAllister et al. |

*Primary Examiner*—John Q. Nguyen
(74) *Attorney, Agent, or Firm*—Mark J. Spolyar

(57) ABSTRACT

A dual hub take-reel for a tape drive comprises an inner hub operatively connectable to a motor and a flexible leader connected at a first to the inner hub so as to be wound on to the inner hub when driven, to rotate by the motor. An outer hub is disposed about the inner hub and has an opening through which the flexible leader extends. The outer hub is arranged on the inner hub and is selectively freely rotatable about the inner hub or locked against the inner hub to rotate with the inner hub. A locking element is responsive to pressure supplied by a tape wrap to press against the inner hub and lock the outer hub to the inner hub by interaction of an engagement surface against the inner hub.

12 Claims, 6 Drawing Sheets

LOCKING DUAL HUB TAPE REEL FOR TAPE DRIVES

RELATED APPLICATIONS

This application claims priority from provisional patent application Ser. No. 60/435,674, filed on Dec. 19, 2002, the entire disclosure of which is hereby incorporated by reference herein.

FIELD OF THE INVENTION

The present invention relates to the field of tape drives, and more particularly, to a tape drive arrangement which has a dual hub take-up reel construction that facilitates reeling in and promoting the formation of highly circular tape windings on the dual hub take-up reel.

BACKGROUND OF THE INVENTION

There are known tape drive mechanisms that thread tape from a single reel cartridge onto a take-up reel. Certain mechanisms utilize a dual hub take-up reel design having an inner hub and an outer hub. The inner hub is concentrically located inside a hollow outer hub. The inner hub is secured rigidly to the motor spindle and the outer hub is free to rotate about the inner hub by a bearing. A flexible leader is fixed to the inner hub, the flexible leader leaving the inner hub surface tangentially and passing through the outer hub through a slotted opening. The flexible leader is attached to a linking body designed to connect and disconnect the end of the tape leader from the single reel cartridge. This slotted opening in the outer hub is configured to allow the leader to pass through, but not the linking body. The configuration of the linking body is matched to the outer surface of the outer hub so that when the linking body is pulled into the outer hub, a continuous cylindrical surface is formed on the outer hub.

As the inner hub rotates, the leader wraps around itself. Tension is maintained in the leader by motor control at the cartridge reel. The tension in the leader prevents the outer hub from rotating. Eventually, the linking body is pulled into the cavity, forming the continuous cylindrical surface on the outer hub. The outer hub now rotates with the inner hub under tension from the leader. This continued rotation wraps tape from the single reel cartridge around the outer surface of the outer hub.

In the above described tape mechanisms it is critical to maintain tape tension at all times. This is normally accomplished by carefully controlling the two reel motors so that their speeds are nearly perfectly coordinated. Depending on which direction the tape is moving, each reel changes roles as supply and take-up. In the case where the dual hub reel is a take-up reel, operation is relatively smooth because the flexible leader is under tension. In the supply role, however, the inner hub attempts to control the outer hub by pushing on a flexible member (i.e., the flexible leader). In order to maintain the necessary tension both in the tape and the flexible leader, the inner hub has to operate as a brake. Acceleration and change in tape direction is limited by the inability to utilize the motor to its full capability, since the motor is only operating as a brake. In the data recording industry, time is very important. Because of that, limitations on acceleration and change in tape direction and increase in access time are particularly undesirable.

SUMMARY OF THE INVENTION

There is a need for a dual hub tape reel that allows a motor to be utilized to its full capabilities, and not limit the inner hub to operate as a brake in order to maintain necessary tension when the dual hub tape reel is in the supply role.

This and other needs are met by embodiments of the present invention which provide a reel for a tape drive comprising an inner hub operatively connectable to a motor, and a flexible leader connected at a first end to the inner hub so as to be wound onto the inner hub when driven to rotate by the motor. An outer hub is disposed about the inner hub and has an opening through which the flexible leader extends. A capture element is provided, and includes a link connected to a second end of the flexible leader for capturing an end of the tape to be wound onto the outer hub. The outer hub is arranged on the inner hub to selectively be freely rotatable thereabout and locked against the inner hub to rotate with the inner hub.

In the present invention, the inner hub may still operate to rotate and wrap a hub leader around itself when the dual reel hub is the take-up reel. However, with the present invention, the outer hub can be locked against the inner hub to rotate with the inner hub. This eliminates the need for the inner hub to operate as a brake, while still maintaining the necessary tension in the tape and the flexible leader.

The earlier stated needs are also met by other aspects of the present invention that provide a dual hub reel for a tape drive, comprising an inner hub and an outer hub, and means for rotationally locking the outer hub and inner hub together.

The earlier stated needs are also met by a further aspect of the present invention which provides a tape drive comprising a dual hub reel having an inner hub and an outer hub. The outer hub is concentrically arranged on the inner hub to selectively rotate freely around the inner hub and to be rotationally locked with the inner hub. The locking element selectively rotationally locks the inner hub and the outer hub.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to the use of a dual hub take-up reel in a tape drive. In particular, the invention solves problems related to maintaining the necessary tension in a tape and a flexible leader, without forcing an inner hub to operate as a brake. This reduces the limitations placed on acceleration and changing tape direction of previous dual hub take-up reel designs. The invention therefore allows the motor to be utilized to its full capabilities. This is achieved, in part, by the selective locking of the outer hub with the inner hub so that both rotate together. When the hubs are locked, the inner hub does not have to operate as a brake so that in the supply role, the dual hub take-up reel can adequately control the outer hub and the necessary tension in the tape can be maintained.

Figure 1:
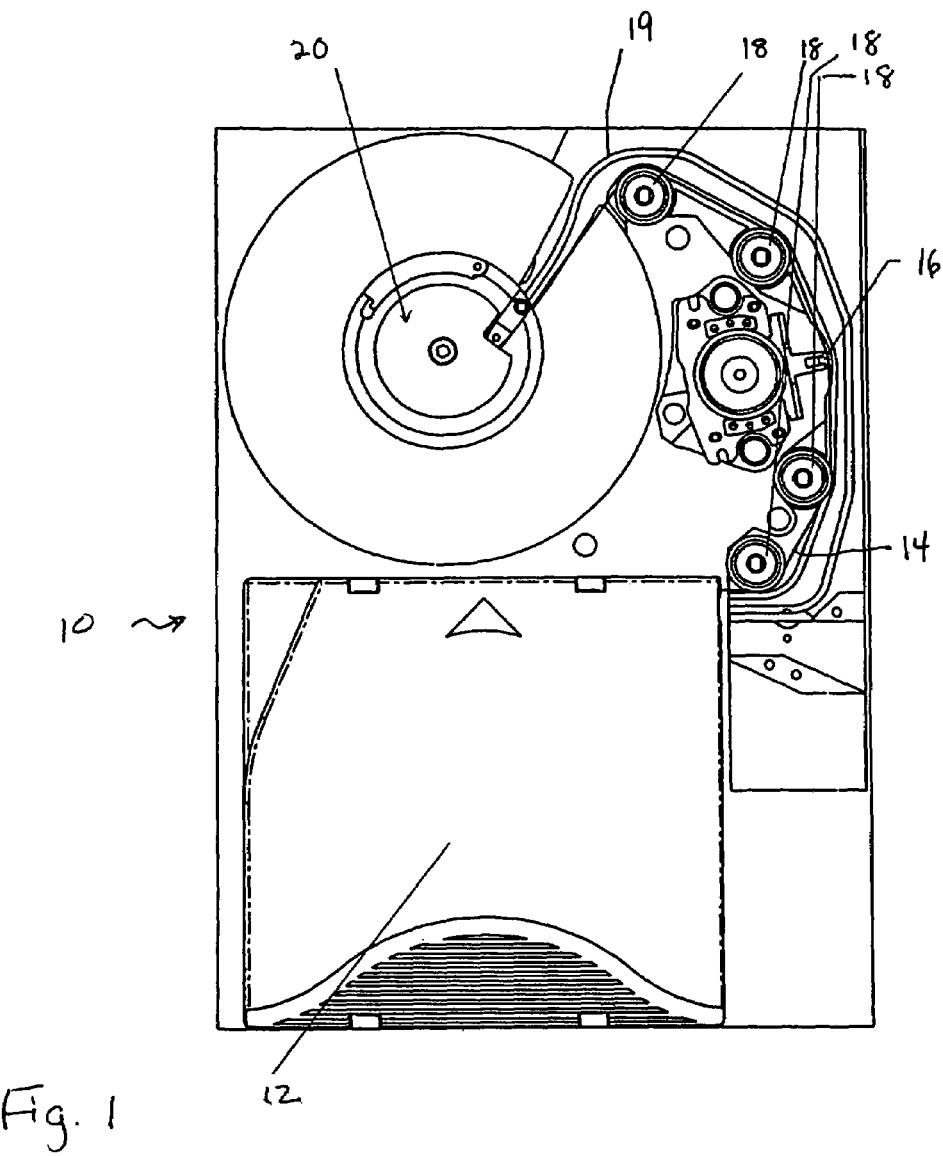
FIG. 1 is a plan view showing a tape drive arrangement which incorporates a take-up reel hub arrangement according to embodiments of the present invention.

FIG. 1 shows an exemplary embodiment of a tape drive utilizing the invention constructed in accordance with embodiments of the present invention. The figure shows the tape drive 10 in a normal plan view. Tape cartridge 12 is inserted into the tape drive 10. Tape 14 is depicted as threaded into the take-up hub assembly 20. Tape 14 is guided by tape guides 18 past a recording head 16. A guide track 19 is used to guide a flexible hub leader between the tape cartridge 12 and the take-up hub assembly 20.

Figure 2:
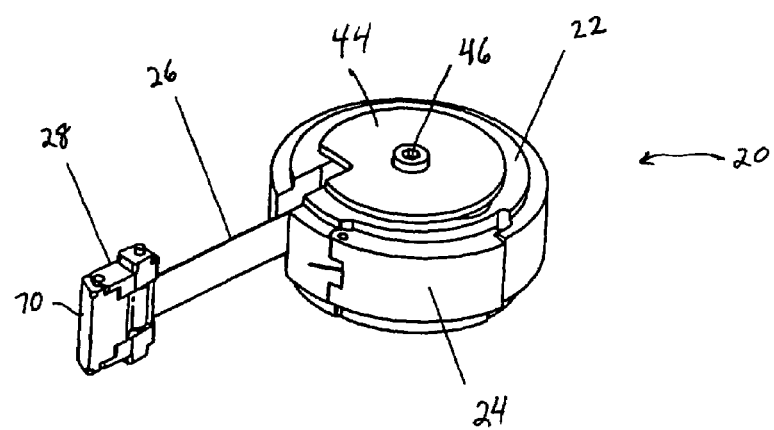
FIG. 2 shows a perspective view of a hub assembly in isolation, constructed in accordance with embodiments of the present invention.
Figure 3:
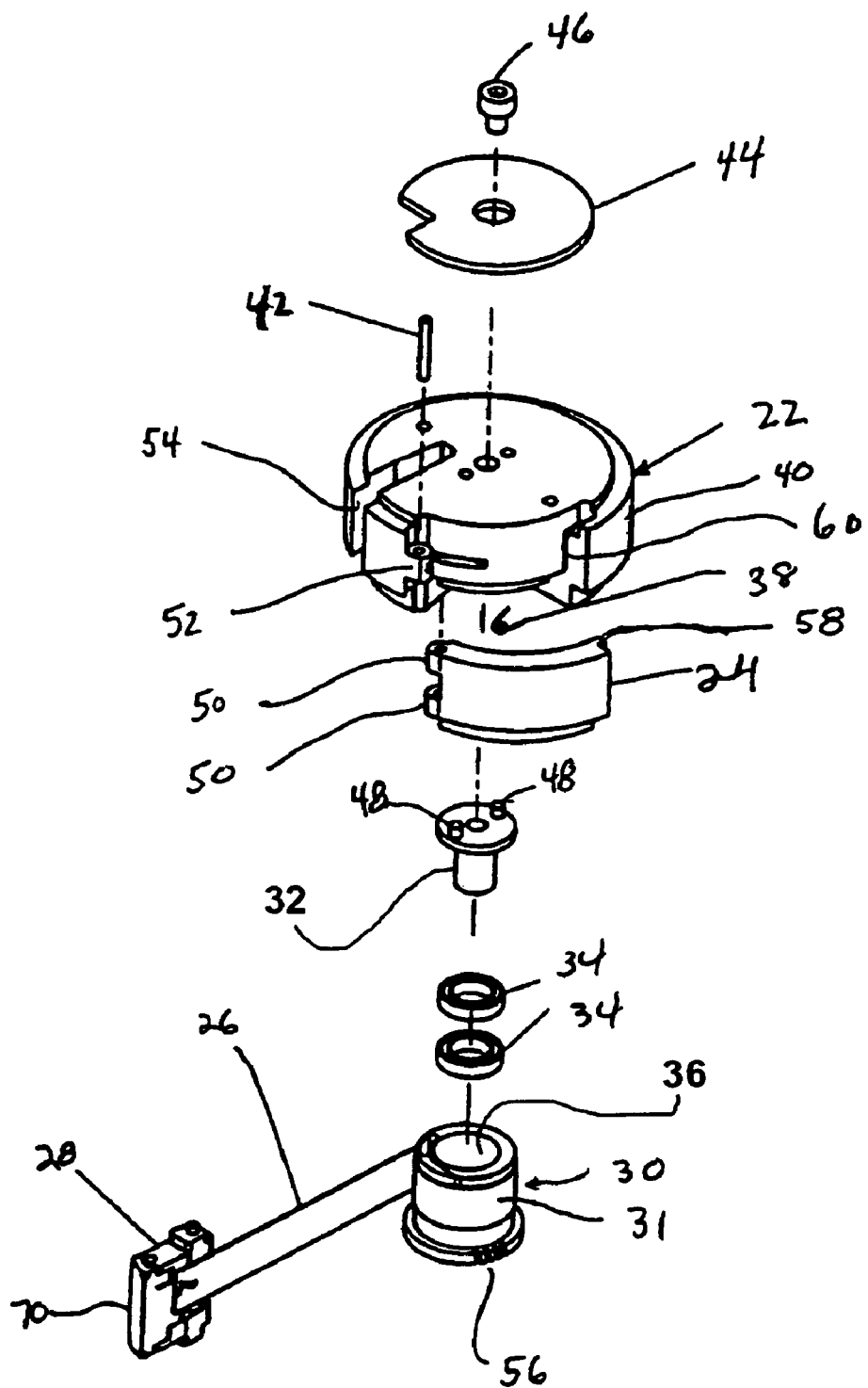
FIG. 3 is an exploded view of the take-up reel hub assembly of FIG. 2.

FIG. 2 shows the hub assembly 20 in a perspective view, while FIG. 3 shows the hub assembly in an exploded view. Referring now to FIGS. 1–3, tape drive 10 is equipped with an embodiment of the invention.

The flexible hub leader 26 (FIGS. 2 and 3), which is made of a suitable flexible polymeric material or other material, is connected between a take-up hub assembly 20 and a leader pin holding assembly (LPHA) 28. The hub assembly 20 generally comprises an outer hub 22 concentrically arranged around an inner hub 30. The inner hub 30 is connected to a motor (not shown) in a known manner so as to be selectively rotatable. The outer hub 22 is mounted to a bearing shaft 32 via mounting elements 48. The bearing shaft 32 rotates within bearings 34 located within bore 36 of the inner hub 30. The outer hub 22 is able to rotate with the bearing shaft 32 around the outer circumference 31 of the inner hub 30.

As an alternative to the inner hub 30 being connected to the motor spindle, in alternative embodiments the inner hub 30 actually forms the motor spindle. The outer races of the bearings 34 are permanently fixed to the inner diameter of the inner hub 30. The inner races of the bearings 34 are attached to the bearing shaft 32 by a typical adhesive bearing assembly method. The outer hub 22 is attached to the bearing shaft 32 by a conventional attachment process, such as grooves and pins as the mounting elements 48.

The hub leader 26 is connected to the inner hub 30 and is closely wound on the circumference 31 thereof when the inner hub 30 is driven to rotate. The hub leader 26 is arranged to extend through the hub leader opening 54 that is integral with the outer hub 22.

A locking element 24 is pivotally mounted on the outer hub 22. The pivotal mounting is achieved through hinge elements 50 on the locking element 24, a hinge element 52 on the outer hub 22, and a hinge pin 42. A catch feature 58 on the locking element 24 interacts with a catch feature 60 on the outer hub 22 to limit the radial outward movement of the locking element 24.

The locking element 24 is biased radially outwardly by a spring 38 that is coupled to the locking element 24. The radial outward movement is limited, as described above, by the interaction of catch features 58 and 60. The locking element 24 pivots around the hinge pin 42.

The hub assembly 20 is completed by the fastening of a top plate 44 on top of the outer hub 22. The top plate 44 is secured by a top plate fastener 46.

The trailing edge of the LPHA 28 has an arcuate shape. The shape is selected such that it is flush with a curved outer peripheral surface of the outer circumference 40 of the outer hub 22 when the LPHA 28 is retracted into the hub leader opening 54. Consequently, the windings of magnetic tape 14, which subsequently are wound onto the outer hub 22, are smooth and circular.

Figure 10:
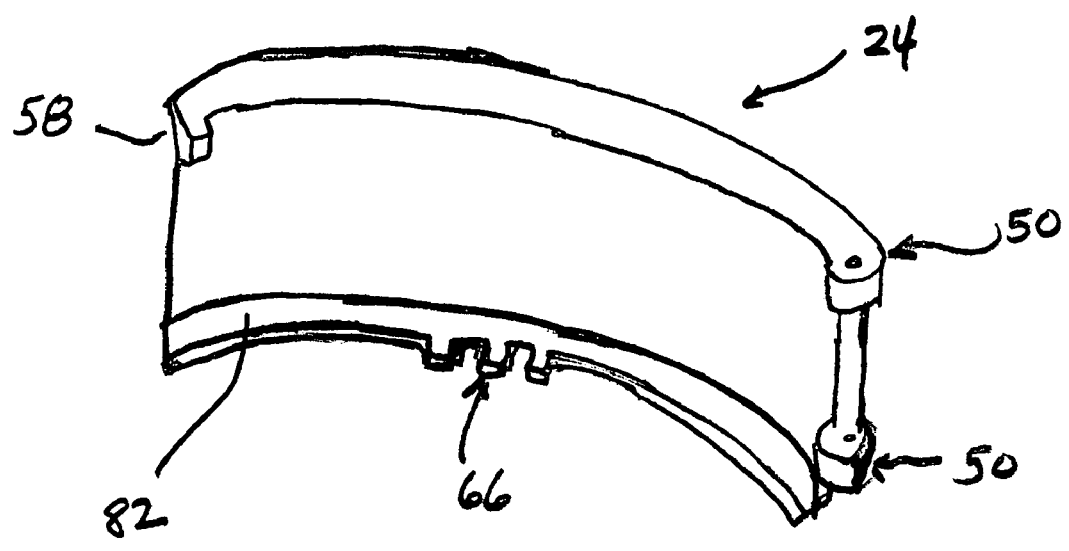
FIG. 10 is a perspective view of an embodiment of the locking element of the outer hub in accordance with an embodiment of the present invention.

FIG. 3 depicts one embodiment of the present invention in which teeth 56 are provided on the inner hub 30, at a lower surface thereof. The mating teeth 56 are arranged on only a portion of the circumference of the inner hub 30 in the embodiment of FIG. 3. These mating teeth 56 are configured to mesh with mating teeth 66 (see FIG. 10) formed on a radial extension 82 of the locking element 24. Mating occurs when the locking element 24 is pressed radially inwardly when the mating teeth 56, 66 are properly registered with each other.

Figure 4:
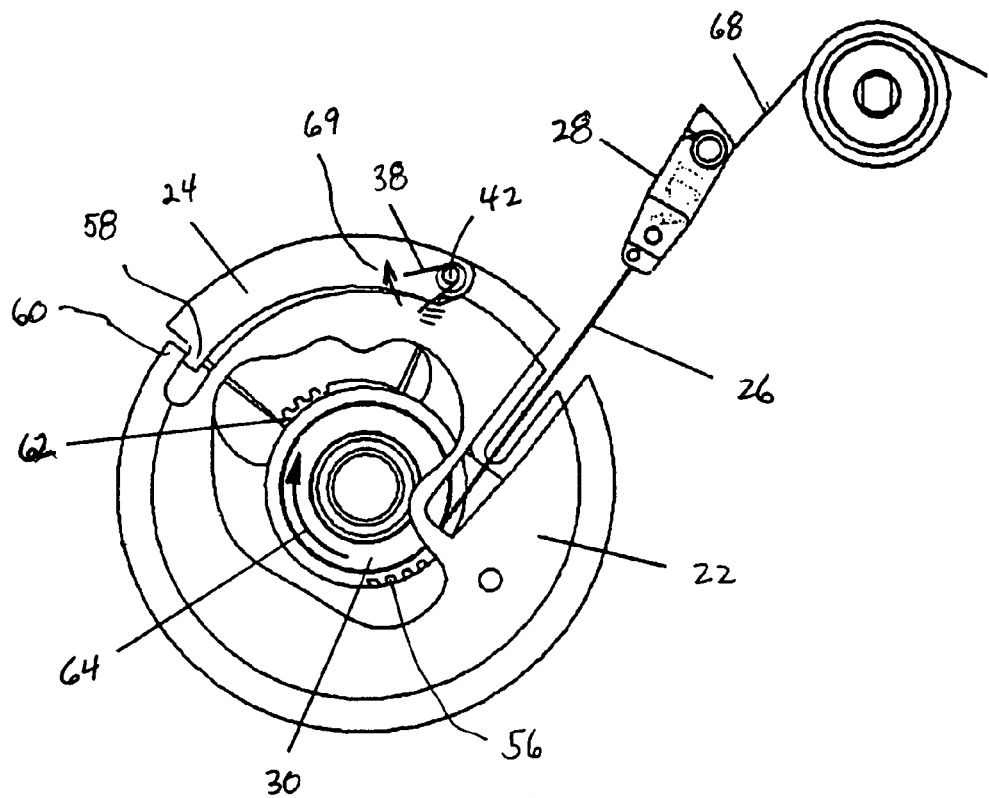
FIG. 4 is a plan view of the take-up reel hub assembly of FIG. 2, with a cut-away section for illustration purposes, depicted during one phase of a take-up process.

Exemplary operation of the invention will now be described with respect to FIGS. 4–7. In FIG. 4, the LPHA 28 is currently outside the take-up hub assembly 20. Tension is created between the hub leader 26 and a tape leader 68 by the conventional method of controlling two reel motors (not shown) in the tape drive 10. At this stage in the take-up process, locking element 24 of the outer hub 22 is separated from the inner hub 30 by the bias force created by the spring 38. This separation is indicated by the gap 62. The radial outward rotation of the locking element 24 is referenced by arrow 69. The catch feature 58 interacts with the catch feature 60 to limit the outward rotation of the locking element 24. The direction of rotation of the inner hub 30 is shown by arrow 64. At this stage, mating teeth 56 on the inner hub 30 are not registered with the mating teeth 66 on the locking element 24.

Figure 5:
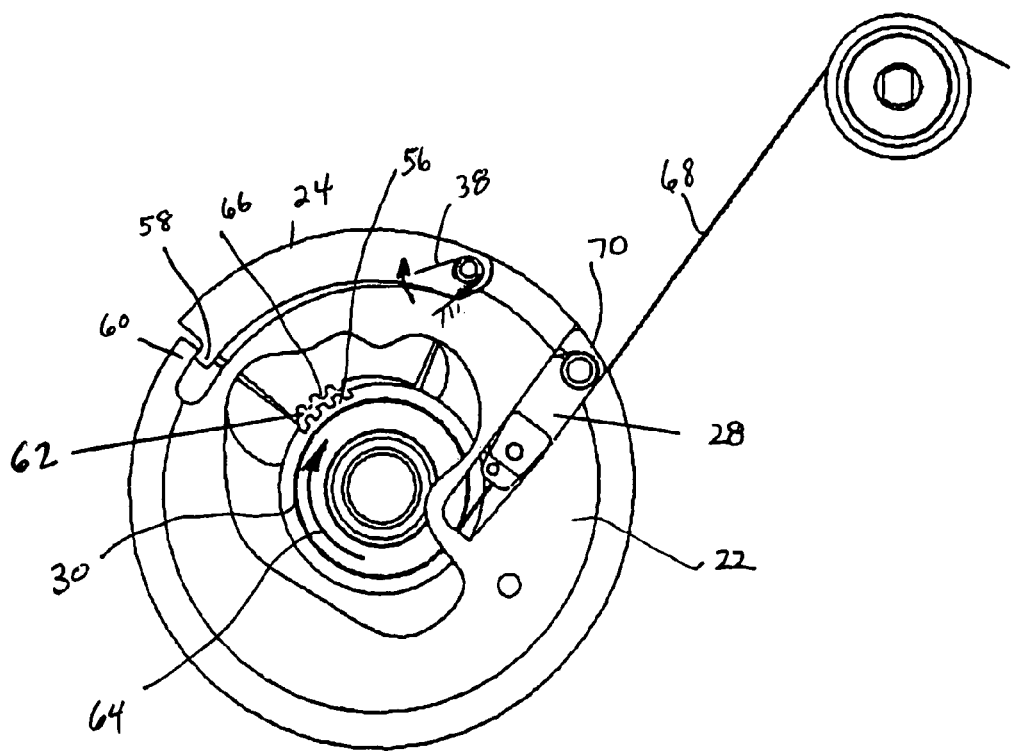
FIGS. 5–7 show the take-up reel during further phases of take-up operation according to embodiments of the present invention.

As the inner hub 30 is rotated clockwise (as seen in FIGS. 4 and 5) in the direction of rotation 64, the LPHA 28 is pulled into the outer hub 22. At this point, the outer hub 22 is still freely rotatable with respect to the inner hub 30 due to the ball bearing arrangement 34, 32 shown in FIGS. 2 and 3. If the outer hub 22 moves due to vibration or other external forces, the position of the outer hub 22 is loosely maintained by the tension of the leader 26 and the tape leader 68.

FIG. 5 depicts the structure of FIG. 4 after the further rotation of the inner hub 30. The mating teeth 56 of the inner hub 30 are now registered with the mating teeth 66 of the locking element 24. The LPHA 28 has been pulled completely inside the outer hub 22 until stopped by features in the outer hub 22 and the top plate 44. The gap 62 is still present between the locking element 24 and the inner hub 30.

Figure 6:
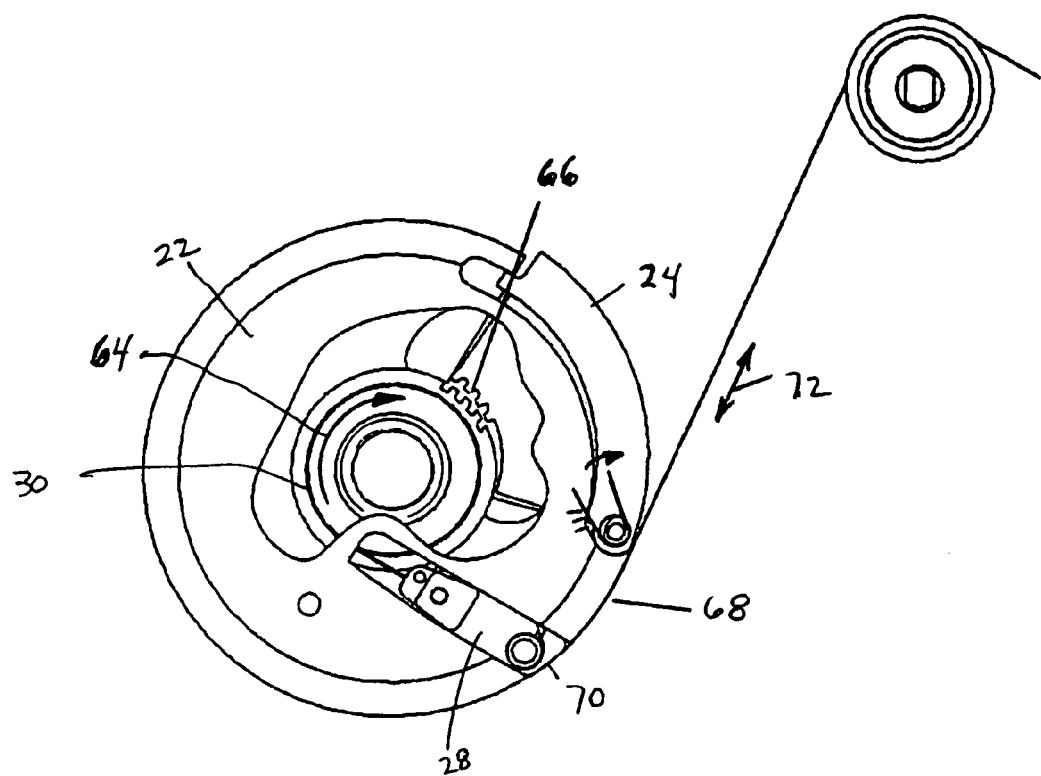

Referring now to FIG. 6, the inner hub 30 is controlled by the motor to continue further in the direction of rotation 64. The outer hub 22 is rotated an equal amount in the direction of rotation 64 due to the force created between inner hub 30 and the outer hub 22 through the hub leader 26. Tension in the tape leader 68 is depicted by reference numeral 72 in FIG. 6. The gap 62 is still present between the locking element 24 and the inner hub 30.

Figure 7:
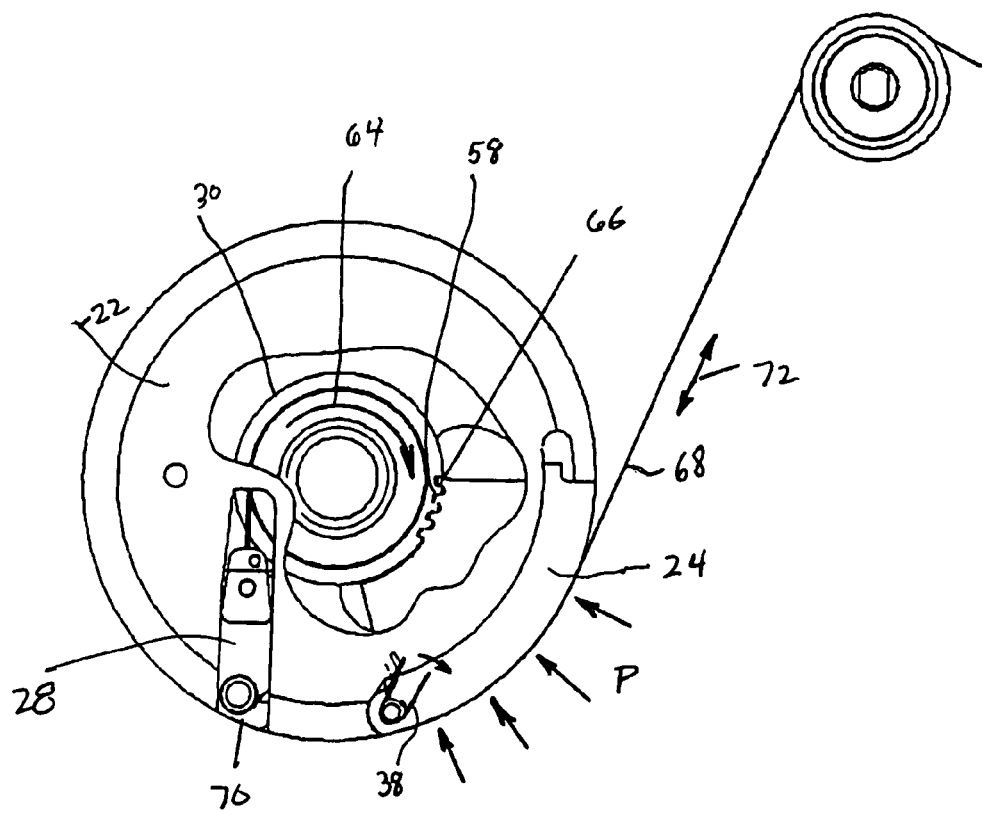

FIG. 7 shows the structure after further rotation of the inner hub 30, as controlled by the motor (not shown). The tape leader 68 has now wrapped over the surface of the locking element 24. This wrapping of the tape causes the locking element 24 to close down on the inner hub 30, eliminating the gap 62. The pressure, P, on the locking element 24 is created from the tension, T, of the tape 14 and tape leader 68 over the outer surface of the locking element 24 according to the equation P=T/(b×r), where b is the height and r is the radius. The spring force created by the spring 38 is selected such that the force of the tape and tape leader 14, 68 upon the first wrap is greater than the spring force provided by spring 38. With each additional wrap of the tape 14 around the outer hub 22, the force increases incrementally on the locking element 24 to thereby create a stronger contact between the locking element 24 and the inner hub 30. This contact between the locking element 24 and the inner hub 30 locks the inner hub 30 together with the outer hub 22. The two hubs 30, 22 now behave as a single, rigid hub. The mating teeth 56, 66 provide for a secure locking when the teeth are meshed together after the locking element 24 is rotated around the hinge pin 42. The rotational locking of the two hubs 22, 30 is maintained while the tape 14 and tape leader 68 are wrapped around the hub 22. Hence, the acceleration and changing of the tape direction is not limited by an inability to utilize the motor to its full capabilities. In other words, due to the rotational locking of the inner hub 30 with the outer hub 22, the inner hub 30 does not have to operate as a brake in order to maintain tension in the tape and the flexible leader when the take-up hub assembly 20 operates in the supply role.

Figure 8:
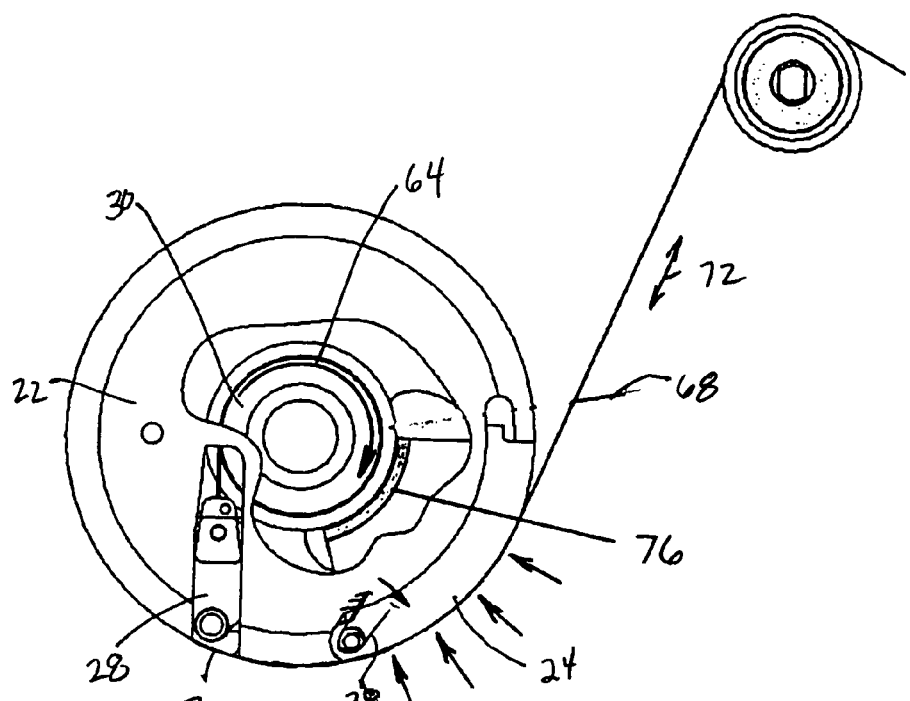
FIG. 8 shows an alternate embodiment of the take-up reel in accordance with the present invention.
Figure 9:
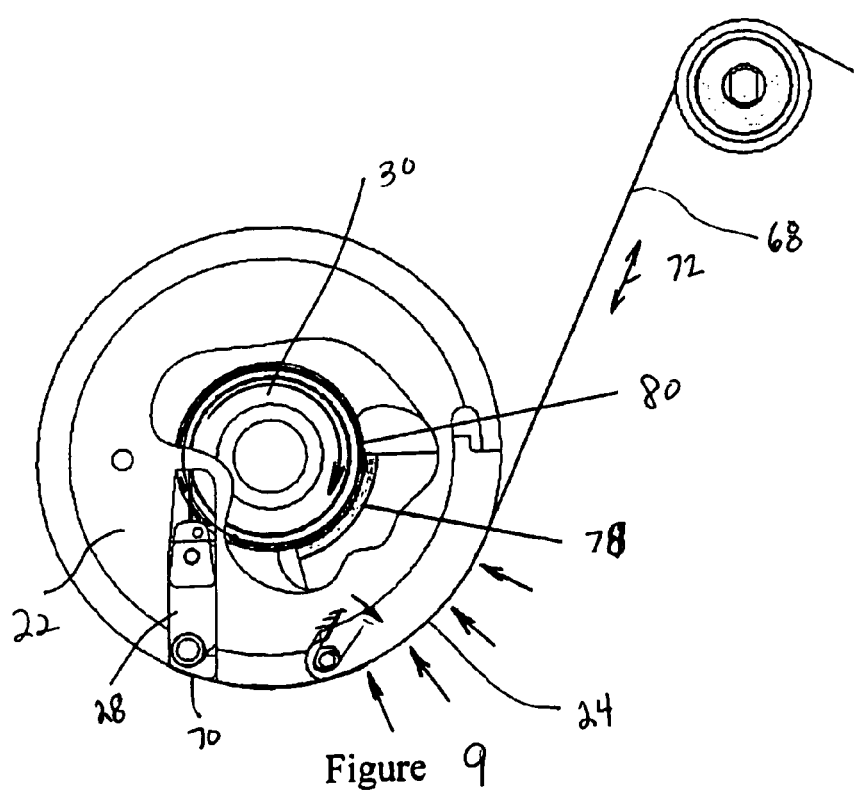
FIG. 9 shows an alternate embodiment of the take-up reel of the present invention.

FIGS. 8 and 9 depict alternate embodiments of the engagement surface that engages against the inner hub 30 when pressure is applied against the locking element 24. In the embodiments of FIGS. 2–7, the engagement surface comprises mating teeth 66. In FIG. 8, the engagement surface comprises a compliant layer 76. An exemplary material for the compliant layer 76 is an elastomeric material, for example. FIG. 9 depicts a still further embodiment of the present invention in which the engagement surface of the locking element 24 comprises a high friction material 78. The outer circumference of the inner hub 30 also includes the high friction material 80. The interaction of the two high friction materials 78, 80 locks the outer hub 22 to the inner hub 30 for rotation when the locking element 24 is pressed against the inner hub 30. Commercially available materials may be employed as the high friction materials in the embodiment of FIG. 9.

The embodiments of FIGS. 8 and 9 have certain advantages over the embodiments of FIGS. 2–7, which employ mating teeth 66 on the engagement surface, since these other embodiments require less precise manufacturing of the mating parts. Further, the embodiment employing mating teeth 58, 66 requires that the leader length be sized exactly correctly, and that the length of this leader remains constant throughout the life of the design so that the registration of the mating teeth 58, 66 is correct. In contrast, the embodiments of FIGS. 8 and 9 only employ two matching cylindrical surfaces. The precision of manufacturing, difficulty of assembly and leader length requirements are not as stringent.

In any event, all of the embodiments of the present invention provide an improved locking dual hub take-up reel that allows the motors to be utilized to their full capabilities. The locking of the outer hub to the inner hub prevents the inner hub from having to operate as a brake when the dual hub take-up reel acts as a supply reel.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A reel for a tape drive, the reel comprising: an inner hub operatively connectable to a motor; a flexible leader connected at a first end to the inner hub so as to be wound onto the inner hub when driven to rotate by the motor; an outer hub disposed about the inner hub and having an opening through which the flexible leader extends; and a capture element, including a link connected to a second end of the flexible leader, for capturing an end of a tape to be wound onto the outer hub; wherein the outer hub is arranged on the inner hub to selectively be freely rotatable thereabout or locked against the inner hub to rotate with the inner hub; further comprising a locking element on at least one of the inner hub and the outer hub, and that selectively locks the outer hub against the inner hub; wherein the locking element is on an outer circumference of the outer hub and responsive to pressure applied against the locking element to engage the inner hub.

2. The reel of claim 1, wherein the locking element has an engagement surface that engages against the inner hub when pressure is applied against the locking element.

3. The reel of claim 2, wherein the engagement surface and the inner hub have complementary interlocking surfaces that engage each other when pressure is applied against the locking element.

4. The reel of claim 3, wherein the complementary interlocking surfaces include mating teeth.

5. The reel of claim 1, wherein the locking element is biased radially outwardly and pressure applied against the locking element is radially inward against the biasing.

6. The reel of claim 5, wherein the locking element is pivotally mounted on the outer circumference of the outer hub and forms part of the outer circumference of the outer hub.

7. The reel of claim 6, further comprising a spring coupled to the locking element to bias the locking element radially outwardly.

8. The reel of claim 7, wherein the pressure is applied against the locking element by tape wrap on the outer circumference of the outer hub.

9. A tape drive comprising: a dual hub reel having: an inner hub; an outer hub concentrically arranged on the inner hub to selectively rotate freely around the inner hub and to be rotationally locked with the inner hub; and a locking element that selectively rotationally locks the inner hub and the outer hub together; wherein the locking element is a portion of an outer circumference of the outer hub, the portion being pivotally mounted to the outer hub to pivot radially inwardly and outwardly.

10. The tape drive of claim 9, further comprising a biasing element coupled to the locking element to bias the locking element to pivot radially outwardly.

11. The tape drive of claim 10, wherein the locking element is responsive to pressure supplied by tape wrap to pivot radially inwardly counter to the bias provided by the biasing element to press the locking element against the inner hub.

12. The tape drive of claim 11, wherein the locking element has an engagement surface, and the engagement surface and the inner hub have complementary interlocking surfaces that engage each other when the locking element is pressed radially inwardly.

* * * * *